United States Patent [19]

Ogino et al.

[11] Patent Number: 5,180,817

[45] Date of Patent: Jan. 19, 1993

[54] TRISAZO COMPOUNDS AND USE THEREOF

[75] Inventors: Kazuya Ogino, Minoo; Kingo Akahori, Toyonaka; Naoki Harada, Ibaraki, all of Japan

[73] Assignee: Sumitomo Chemical Company, Limited, Osaka, Japan

[21] Appl. No.: 670,581

[22] Filed: Mar. 18, 1991

[30] Foreign Application Priority Data

Mar. 28, 1990 [JP] Japan ................... 2-081762

[51] Int. Cl.$^5$ .................... C07C 245/10; C09B 31/16
[52] U.S. Cl. ..................... 534/811; 534/812
[58] Field of Search ................ 534/812, 811

[56] References Cited

U.S. PATENT DOCUMENTS 4,235,773 11/1980 Huhne et al. .
4,591,634 5/1986 Herd et al. ............... 534/812
4,624,708 11/1986 Solodar .

FOREIGN PATENT DOCUMENTS 2255652 5/1973 Fed. Rep. of Germany ...... 534/812
2401594 9/1974 Fed. Rep. of Germany ...... 534/812
2201978 9/1987 Japan ...................... 534/811
1327914 6/1971 United Kingdom .
1417428 11/1972 United Kingdom .

OTHER PUBLICATIONS

Chem. Abs. vol. 95, 188627y (1981).

Chem Abs. vol. 106, 19949v (1987)*(=JP 61 51064 as cited above).

*Primary Examiner*—Marianne M. Cintins
*Assistant Examiner*—John Peabody
*Attorney, Agent, or Firm*—Stevens, Davis, Miller & Mosher

[57] ABSTRACT

A trisazo compound represented by the following formula in the free acid form:

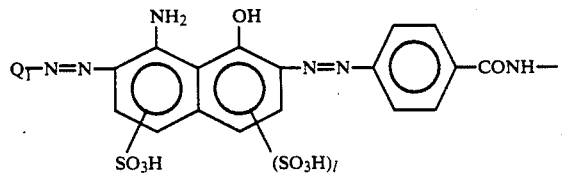

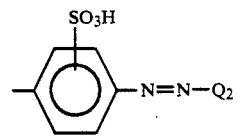

wherein $Q_1$ and $Q_2$ independently of one another are each unsubstituted or substituted phenyl or naphthyl group and l represents 0 or 1, which is useful for dyeing fiber, paper, leather and the like having hydroxy or amido group in black color, and for use in an ink used in ink jet and the like.

10 Claims, No Drawings

TRISAZO COMPOUNDS AND USE THEREOF

The present invention relates to trisazo compounds. More particularly, the present invention relates to trisazo compounds useful for dyeing or printing fiber, paper, leather and the like having hydroxy or amido group, in black color, and for use in an ink used in ink jet and the like.

In Japanese Patent Application Kokai (Laid-Open) No. 61-51064, dyes represented by, for example, the following formula are disclosed:

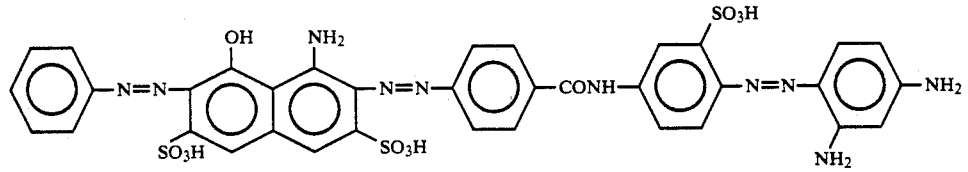

Polyazo direct or acid dye prepared using benzidine or its derivative have been used for dyeing or printing a fiber having hydroxyl or amido group, or a composition comprising said fiber. However, in many countries, production of benzidine is now prohibited, and benzidine derivatives such as o-tolidine and dianisidine are registered as special chemical substances of which handling is restricted in production and use, because of their toxicity.

For such a reason, a variety of compounds have been proposed as non-benzidine type dyes. However, they do not reach a level capable of satisfying the requirements of users at the present stage, particularly in the dye abilities. Thus, it is earnestly desired to provide a further improved compound.

The present inventors have undertaken extensive study to find novel compounds capable of fulfilling the necessary conditions of a dye, without using benzidine nor benzidine derivative, and as a result attained the present invention.

The present invention provides trisazo compounds represented by the following formula (I) in the free acid form:

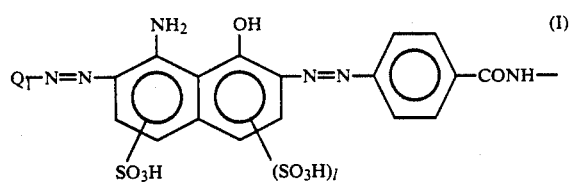

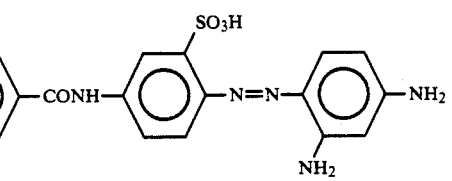

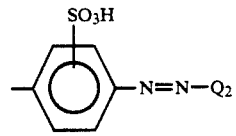

wherein $Q_1$ and $Q_2$ independently of one another are each unsubstituted or substituted phenyl or naphthyl group and $l$ represents 0 or 1.

Among the trisazo compounds of the present invention represented by the formula (I), the trisazo compounds represented by the following formulas (II) and (III) in the free acid form are preferable:

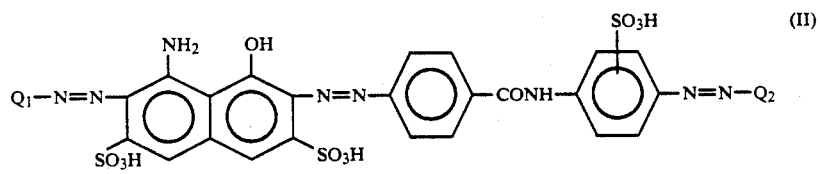

wherein $Q_1$ and $Q_2$ are as defined above,

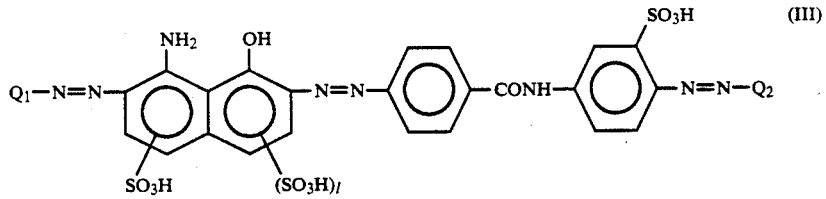

wherein $l$, $Q_1$ and $Q_2$ are as defined above.

Among these trisazo compounds, the trisazo compounds represented by the following general formula (IV) in the free acid form are particularly preferable:

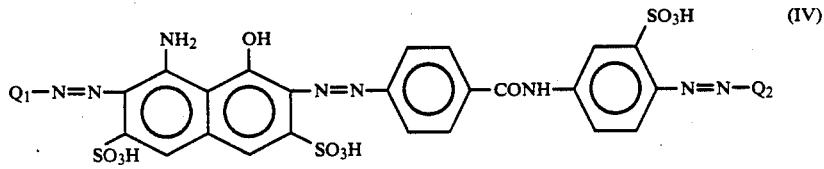

wherein $Q_1$ and $Q_2$ are as defined above.

The unsubstituted or substituted phenyl group represented by $Q_1$ is preferably represented by the following formula:

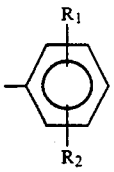

wherein $R_1$ and $R_2$ independently of one another are each hydrogen, nitro, sulfo, sulfamoyl, alkyl, alkoxy, substituted or unsubstituted amino, carboxy or halogeno group, and particularly preferably a phenyl group unsubstituted or substituted by nitro, sulfo, sulfamoyl, methyl, ethyl, methoxy, ethoxy, carboxy or chloro group.

The unsubstituted or substituted naphthyl group represented by $Q_1$ is preferably represented by the following formula:

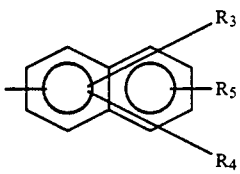

wherein $R_3$, $R_4$ and $R_5$ independently of one another are each hydrogen, hydroxy or sulfo group.

The unsubstituted or substituted phenyl group represented by $Q_2$ is preferably a phenyl group substituted once or twice by substituted or unsubstituted amino group and unsubstituted or substituted by hydroxy, sulfo, alkyl, alkoxy or carboxy group, or a phenyl group substituted once, twice or three times by hydroxy group and unsubstituted or substituted by substituted or unsubstituted amino, sulfo, alkyl, alkoxy or carboxy group. As examples of the substituted amino group, amino groups substituted by methyl, ethyl, hydroxyethyl, cyanoethyl, acetyl or carbamoyl group can be referred to. As said alkyl and alkoxy, methyl, ethyl, methoxy and ethyoxy can be referred to.

The unsubstituted or substituted naphthyl group represented by $Q_2$ is preferably a naphthyl group substituted once or twice by hydroxy group and unsubstituted or substituted by sulfo, unsubstituted amino, acetyl, phenyl, sulfophenyl, disulfophenyl, benzoyl or methyl-substituted amino, or a naphthyl group substituted once or twice by unsubstituted amino group or methyl-, ethyl-, hydroxyethyl-, cyanoethyl-, acetyl-or carbamoyl-substituted amino group(s) and unsubstituted or substituted by hydroxy or sulfo.

The compound of the present invention is used in the form of free acid or preferably in the form of alkali metal salt, ammonium salt or organic amine salt. For example, it is used in the form of lithium salt, sodium salt, potassium salt, monoethanolamine salt, diethanolamine salt, triethanolamine salt or the like.

Such trisazo compounds represented by the formula (I) can be produced, for example, in the following manner.

A compound represented by the following formula (V):

$$Q_1—NH_2 \quad (V)$$

wherein $Q_1$ is as defined above, is diazotized in a conventional manner followed by coupling with a compound represented by the following formula (VI) in the free acid form:

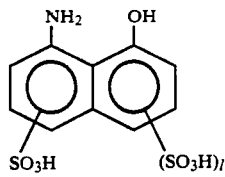

wherein l is as defined above, in an aqueous medium under an acidic condition and then the product of the coupling reaction is further coupled in an acidic or weakly alkaline aqueous medium with a tetrazo compound prepared by tetrazotizing in a conventional manner a compound represented by the following formula (VII):

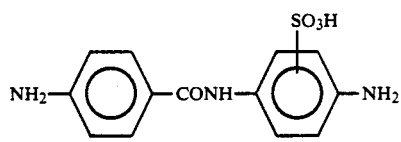

and the disazo-diazo compound thus obtained is coupled with a compound represented by the following formula (VIII):

$$Q_2—H \quad (VIII)$$

wherein $Q_2$ is as defined above, to form a trisazo compound represented by the formula (I).

Examples of the compound represented by the formula (V) include 1-aminobenzene, 1-amino-2-, 3- or 4-nitrobenzene, 1-amino-2, 3- or 4-benzenesulfonic acid, 5-aminobenzene-1,3-disulfonic acid, 6-aminobenzene-1,4-disulfonic acid, 4-aminobenzene-1,2-disulfonic acid, 1-amino-2-, 3- or 4-sulfamoylbenzene, 1-amino-2-, 3-or 4-benzoic acid, 1-amino-2-, 3- or 4-chlorobenzene, 1-amino-2,5-dichlorobenzene, 1-amino-2-, 3- or 4-bromobenzene, 1-amino-2-, 3- or 4-methylbenzene, 1-amino-2-, 3-or 4-ethylbenzene, 1-amino-2-, 3- or 4-methoxybenzene, 1-amino-2-, 3- or 4-ethoxybenzene, 1,4-diaminobenzene-2-sulfonic acid, 4-di($\beta$-hydroxyethyl)-1-aminobenzene, 1-aminonaphthalene-4-, 5-, 6-, 7- or 8-sulfonic acid, 2-aminonaphthalene-1-, 8-, 7-, 6- or 5-sulfonic acid, 1-aminonaphthalene-4,7-, 4,6-, 3,7-, 3,8- or 3,6-disulfonic acid, 2-aminonaphthalene-4,8-, 6,8-, 3,6-, 1,5- or 5,7-disulfonic acid, 1-amino-naphthalene-3,6,8-trisulfonic acid, 2-aminonaphthalene-3,6,8- or 4,6,8-trisulfonic acid, and the like.

Examples of the compound represented by the formula (VI) include 1-amino-8-naphthol-4-sulfonic acid, 1-amino-8-naphthol-3,6- or 4,6-disulfonic acid, and the like, among which 1-amino-8-naphthol-3,6-disulfonic acid is particularly preferable.

Examples of the compound represented by the formula (VII) include 4,4'-diaminobenzanilide-3'-sulfonic acid and 4,4'-diaminobenzanilide-2'-sulfonic acid. Among them, 4,4'-diaminobenzanilide-3'-sulfonic acid is particularly preferable.

Examples of the compound represented by the formula (VIII) include aniline derivatives, phenol derivatives, aminophenol derivatives, naphthol derivatives, naphthylaminesulfonic acid derivatives, naphtholsulfonic acid derivatives and the like. Among them, 1-hydroxybenzene, 1-hydroxy-2-, 3- or 4-methylbenzene, 1,3-dihydroxybenzene, 1-hydroxy-3-methoxybenzene, 1-hydroxy-3-aminobenzene, 3-di(β-hydroxyethyl)amino-1-hydroxybenzene, 1-di(β-hydroxyethyl)aminobenzene, 1,3-diamino-4-methylbenzene, 1-hydroxy-2-benzoic acid, 1,3-diaminobenzene-6-sulfonic acid, 1-acetylamino-4-methoxy-3-di(β-hydroxyethyl)aminobenzene, 3-diethylamino-1-hydroxybenzene, 1-hydroxynaphthalene, 1-hydroxynaphthalene-4-, 5- or 3-sulfonic acid, 1-hydroxynaphthalene-3,8- or 3,6-disulfonic acid, 1-hydroxynaphthalene-3,6,8-trisulfonic acid, 2-hydroxynaphthalene, 2-hydroxynaphthalene-8-, 7- or 6-sulfonic acid, 2-hydroxynaphthalene-6,8- or 3,6-disulfonic acid, 2-amino-, methylamino-, ethylamino-, acetylamino-, propionylamino-, benzoylamino-, carbamoylamino-, sulfamoylamino or phenylamino-8-hydroxynaphthalene-6-sulfonic acid, 3-amino-, methylamino-, ethylamino-, propionylamino-, acetylamino-, benzoylamino-, carbamoylamino-, sulfamoylamino- or phenylamino-8-hydroxynaphthalene-6-sulfonic acid, 1-amino- or acetylamino-8-hydroxynaphthalene-3,6-disulfonic acid, 1-amino- or acetylamino-8-hydroxynaphthalene-4,6-disulfonic acid, 1-amino-8-hydroxynaphthalene-2,4-disulfonic acid, 1,8-dihydroxynaphthalene-3,6-disulfonic acid, and the like are preferable.

The trisazo compound of the present invention is usable either singly or in the form of a mixture, and useful particularly for dyeing cellulose fibers such as rayon, cotton and the like, paper, leather, silk, synthetic polyamide and the like. The dyeing can be carried out by various dyeing processes and printing processes such as exhaustion dyeing process and the like. In such dyeing processes, the compounds of the present invention exhibit excellent performances and are usually useful as a black-colored dye. Particularly, they have a good solubility ability and a high fixation property and can give a deep black colored dyed product. Further, they are characterized by their good build-up property and the ability to give a dyed product of excellent fastness.

Further, the compounds of the present invention can be made into a stable liquid composition. The liquid composition is particularly suitable for dyeing rayon and paper. Further, the liquid composition is successfully usable as an ink which can be applied, for example, by the ink jet process.

The compounds of the present invention are particularly excellent in solubility. Thus, the ink prepared therefrom has a good storage stability which has so far been an important problem in the field of inks for use in ink jet process. Further, the ink is characterized in that it is free from the problem of clogging of nozzle caused by deposited matter and it can form a deep black-colored image excellent in ink characteristics such as clarity, water resistance and light resistance.

The present invention will be illustrated in more detail by way of the following examples. In the examples, parts are by weight.

EXAMPLE 1

Aniline (9.3 parts) was diazotized in a conventional manner and coupled with 31.9 parts of 1-amino-8-naphthol-3,6-disulfonic acid at 0°–5° C. under an acidic condition. Then, a tetrazo compound prepared by tetrazotizing 30.7 parts of 4,4'-diaminobenzanilide-3'-sulfonic acid in a conventional manner was poured thereinto and coupled at 0°–10° C. under a neutral condition. Then, 10.9 parts of 1-hydroxy-3-aminobenzene was added and the reaction was completed, after which the product was salted out and isolated in a conventional manner to obtain a trisazo compound represented by the following formula in the free acid form:

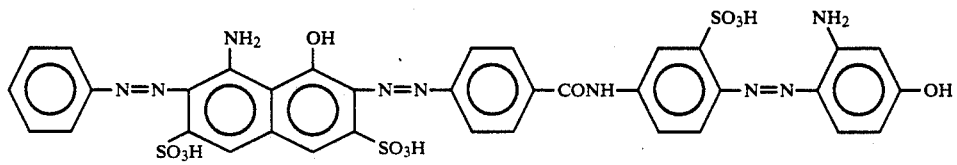

(λmax = 605 nm in aqueous medium)

EXAMPLE 2

Example 1 was repeated, except that the 1-hydroxy-3-aminobenzene used in Example 1 was replaced with the compounds of the formula (VIII) as shown in the second column of the following table. Thus, the corresponding trisazo compounds were obtained. In the table, λmax denotes the values measured in an aqueous medium.

| No. | Compound of formula (VIII) | λmax (nm) |
|---|---|---|
| 1 | OH-phenyl | 600 |
| 2 | OH-phenyl-OH | 610 |
| 3 | OH-phenyl(HO)(OH) | 590 |
| 4 | phenyl-N(C$_2$H$_5$)$_2$, OH | 500 |
| 5 | phenyl-N(C$_2$H$_4$OH)$_2$ | 570 |

-continued

| No. | Compound of formula (VIII) | λmax (nm) |
|---|---|---|
| 6 | 4-OCH₃, 3-NHCOCH₃, N(C₂H₄OH)₂-substituted benzene | 550 |
| 7 | C₆H₅-N(C₂H₄OH)(C₂H₄CN) | 565 |
| 8 | C₆H₅-N(C₂H₅)(C₂H₄CN) | 570 |
| 9 | 2,4-diamino-benzenesulfonic acid | 600 |
| 10 | salicylic acid (2-OH, COOH benzene) | 600 |
| 11 | 2,4-diamino-toluene | 600 |
| 12 | 1-OH, 3-SO₃H, 6-NHCH₃ naphthalene | 600 |
| 13 | 1-OH, 3-SO₃H, 6-NHCOCH₃ naphthalene | 600 |
| 14 | 1-OH, 3-SO₃H, 6-NHCO-C₆H₅ naphthalene | 595 |
| 15 | 1-OH, 3-SO₃H, 6-NHCO-C₆H₅ naphthalene (isomer) | 630 |
| 16 | 8-OH, 6-SO₃H, 2-NH-C₆H₅ naphthalene | 600 |
| 17 | 1-OH, 4-SO₃H naphthalene | 600 |
| 18 | 4-NH₂, 1-SO₃H naphthalene | 595 |

EXAMPLE 3

Example 1 was repeated, except that the aniline used in Example 1 was replaced with the compounds of formula (V) as shown in the second column of the following table. Thus, the corresponding trisazo compounds were obtained. In the table, λmax denotes the values measured in an aqueous medium.

| No. | Compound of formula (V) | λmax (nm) |
|---|---|---|
| 19 | 4-Cl-aniline | 605 |
| 20 | 4-H₂NSO₂-aniline | 625 |
| 21 | 4-HOOC-aniline | 610 |
| 22 | 2-OCH₃-aniline | 600 |
| 23 | 2-Cl-aniline | 615 |
| 24 | 3-Cl-aniline | 620 |

-continued

| No. | Compound of formula (V) | λmax (nm) |
|---|---|---|
| 25 | 2,5-dichloroaniline | 630 |
| 26 | 4-aminobenzenesulfonic acid | 600 |
| 27 | 2-methylaniline | 600 |
| 28 | 4-nitroaniline | 620 |
| 29 | 4-amino-1-naphthalenesulfonic acid | 620 |
| 30 | 6-amino-2-naphthalenesulfonic acid | 615 |
| 31 | 5-amino-1-naphthalenesulfonic acid | 615 |
| 32 | 2-amino-1-naphthalenesulfonic acid | 615 |
| 33 | 2-amino-1-naphthalenesulfonic acid (isomer) | 610 |
| 34 | 2-amino-6-naphthalenesulfonic acid | 615 |
| 35 | 3-amino-naphthalene-1,5-disulfonic acid | 615 |
| 36 | 2-amino-naphthalene-1,5-disulfonic acid | 610 |

EXAMPLE 4

Example 1 can be repeated, except that the aniline and 1-hydroxy-3-aminobenzene used in Example 1 are replaced with the compounds of formula (V) used in Example 3 and the compounds of formula (VIII) used in Example 2, respectively, to obtain the corresponding trisazo compounds.

EXAMPLE 5

Example 1 was repeated, except that the 1-amino-8-naphthol-3,6-disulfonic acid and 4,4'-diaminobenzanilide-3'-sulfonic acid used in Example 1 were replaced with 1-amino-8-naphthol-4,6-disulfonic acid and 4,4'-diaminobenzanilide-2'-sulfonic acid, respectively. Thus, trisazo compound represented by the following formula in the free acid form was obtained:

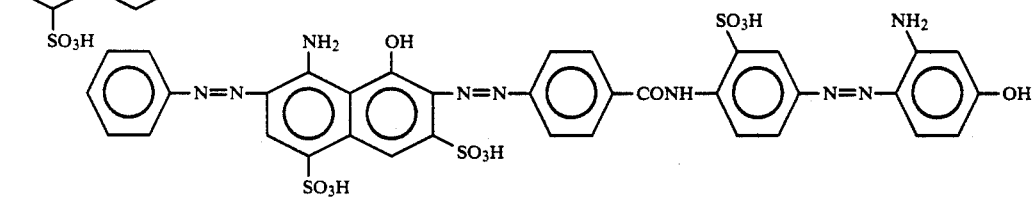

(λmax = 610 nm, in aqueous medium)

EXAMPLE 6

A dyeing bath was prepared by dissolving 0.25 part of the trisazo compound obtained in Example 1 into 200 parts of water. In the dyeing bath was dipped 5.0 parts of viscose rayon staple fiber yarn. After maintaining the bath at 90° C. for 10 minutes, 0.25 part of anhydrous sodium sulfate was added, and dyeing was carried out at that temperature for 40 minutes. Then, the yarn was washed with water and dried. The dyed product thus obtained had a black color tone and an excellent fastness.

EXAMPLE 7

Into 500 parts of an LBKP 20 g/liter pulp dispersion having been beaten up to a degree of beating of CF 400 ml was introduced 0.5 part of the trisazo compound obtained in Example 3 (No. 19). After agitating the mixture for 10 minutes, 0.3 part of Sizepine E (sizing agent manufactured by Arakawa Chemical Industry, Co.). After an additional 10 minutes had passed, 0.3 part of crystalline aluminum sulfate was added, and agitation was continued for 20 minutes to carry out dyeing. Then, the pulp was made into paper and dried. The paper thus prepared had a black color tone and an excellent fastness.

EXAMPLE 8

A composition of the following formulation was heated at about 50° C. with agitation to form a uniform solution and then filtered through a Teflon filter having a pore diameter of 0.45 μm to prepare an ink.

| | |
|---|---|
| Trisazo compound obtained in Example 1 | 5 parts |
| Deionized water | 75 parts |
| Diethylene glycol | 25 parts |
| Dehydroacetic acid sodium salt | 0.05 part |

Using the ink thus obtained, an ink jet recording was carried out on a commercially available high quality paper by means of a recording apparatus equipped with an On-Demand type recording head discharging an ink by the action of a piezoelectric vibrator. The image thus formed was excellent in water resistance, light resistance, color depth and clarity.

EXAMPLE 9

Example 1 was repeated, except that the aniline and 1-hydroxy-3-aminobenzene used in Example 1 were replaced with the compounds as shown in the second column of the following table (compound of formula (V)) and the compounds of the third column of the following table (compound of formula (VIII)), respectively, to synthesize the corresponding trisazo compounds. In the table, λmax denotes the values in an aqueous medium.

| No. | Compound of formula (V) | Compound of formula (VIII) | λmax (nm) |
|---|---|---|---|
| 37 | 2-Cl, 1-NH₂ phenyl | 1-OH, 3-OH phenyl | 610 |
| 38 | 1-NH₂, 4-Cl phenyl | 1-OH, 3-OH phenyl | 625 |
| 39 | 4-Cl, 1-NH₂ phenyl | 1-OH, 3-OH phenyl | 610 |
| 40 | 2-SO₃H, 1-NH₂ phenyl | 1-OH, 3-OH phenyl | 610 |
| 41 | 1-NH₂, 3-SO₃H phenyl | 1-OH, 3-OH phenyl | 605 |
| 42 | 4-HO₃S, 1-NH₂ phenyl | 1-OH, 3-OH phenyl | 610 |
| 43 | 2-SO₃H, 5-HO₃S, 1-NH₂ phenyl | 1-OH, 3-OH phenyl | 620 |

-continued

| No. | Compound of formula (V) | Compound of formula (VIII) | λmax (nm) |
|---|---|---|---|
| 44 | 2-amino-1,4-benzenedisulfonic acid (SO₃H, NH₂, SO₃H on benzene) | resorcinol (1,3-dihydroxybenzene) | 620 |
| 45 | 4-aminobenzoic acid (HOOC–C₆H₄–NH₂) | resorcinol (1,3-dihydroxybenzene) | 615 |
| 46 | 4-aminobenzenesulfonamide (H₂NO₂S–C₆H₄–NH₂) | resorcinol (1,3-dihydroxybenzene) | 625 |
| 47 | sulfanilic acid (HO₃S–C₆H₄–NH₂) | phloroglucinol (1,3,5-trihydroxybenzene) | 605 |
| 48 | sulfanilic acid (HO₃S–C₆H₄–NH₂) | 4-amino-2-methylphenol (CH₃, OH, NH₂ on benzene) | 615 |
| 49 | sulfanilic acid (HO₃S–C₆H₄–NH₂) | 2-amino-8-hydroxynaphthalene-6-sulfonic acid (OH, SO₃H, NH₂ on naphthalene) | 600 |
| 50 | sulfanilic acid (HO₃S–C₆H₄–NH₂) | 2-benzamido-8-hydroxynaphthalene-6-sulfonic acid (OH, SO₃H, NHCOC₆H₅ on naphthalene) | 625 |
| 51 | 2-chloroaniline (Cl, NH₂ on benzene) | 3-(diethylamino)phenol (N(C₂H₅)₂, OH on benzene) | 610 |
| 52 | 3-chloroaniline (NH₂, Cl on benzene) | 3-(diethylamino)phenol (N(C₂H₅)₂, OH on benzene) | 610 |

-continued

| No. | Compound of formula (V) | Compound of formula (VIII) | λmax (nm) |
|---|---|---|---|
| 53 | 4-Cl-C$_6$H$_4$-NH$_2$ | 3-OH-C$_6$H$_4$-N(C$_2$H$_5$)$_2$ | 615 |
| 54 | 2-SO$_3$H-C$_6$H$_4$-NH$_2$ | 3-OH-C$_6$H$_4$-N(C$_2$H$_5$)$_2$ | 610 |
| 55 | 3-SO$_3$H-C$_6$H$_4$-NH$_2$ | 3-OH-C$_6$H$_4$-N(C$_2$H$_5$)$_2$ | 605 |
| 56 | 4-SO$_3$H-C$_6$H$_4$-NH$_2$ | 3-OH-C$_6$H$_4$-N(C$_2$H$_5$)$_2$ | 610 |
| 57 | 2,4-(SO$_3$H)$_2$-C$_6$H$_3$-NH$_2$ | 3-OH-C$_6$H$_4$-N(C$_2$H$_5$)$_2$ | 620 |
| 58 | 2,5-(SO$_3$H)$_2$-C$_6$H$_3$-NH$_2$ | 3-OH-C$_6$H$_4$-N(C$_2$H$_5$)$_2$ | 620 |
| 59 | 4-HOOC-C$_6$H$_4$-NH$_2$ | 3-OH-C$_6$H$_4$-N(C$_2$H$_5$)$_2$ | 610 |
| 60 | 4-H$_2$NO$_2$S-C$_6$H$_4$-NH$_2$ | 3-OH-C$_6$H$_4$-N(C$_2$H$_5$)$_2$ | 625 |
| 61 | 4-Cl-C$_6$H$_4$-NH$_2$ | 1-OH-3-SO$_3$H-6-NHCOCH$_3$-naphthalene | 600 |
| 62 | 4-HO$_3$S-C$_6$H$_4$-NH$_2$ | 1-OH-3-SO$_3$H-6-NHCOCH$_3$-naphthalene | 600 |

-continued
| No. | Compound of formula (V) | Compound of formula (VIII) | λmax (nm) |
|---|---|---|---|
| 63 | 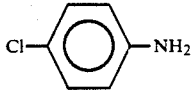 | 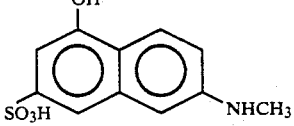 | 600 |
| 64 | 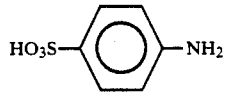 | 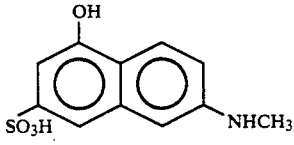 | 600 |
| 65 |  | 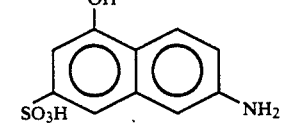 | 600 |
| 66 | 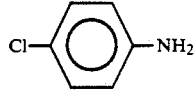 | 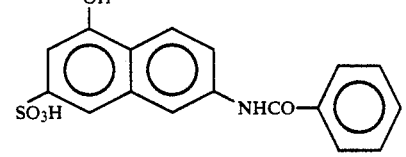 | 630 |
| 67 | 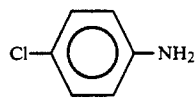 | 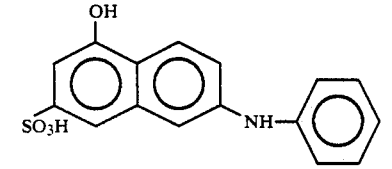 | 600 |
| 68 | 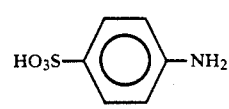 | 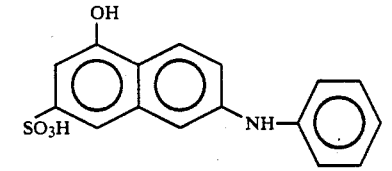 | 600 |
| 69 | 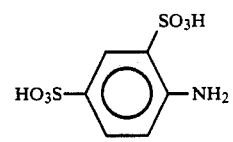 | 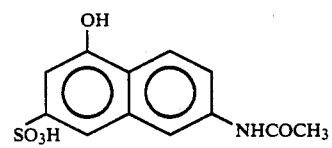 | 620 |
| 70 | 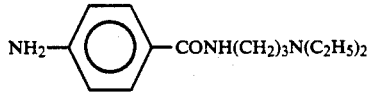 | 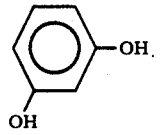 | 600 |
| 71 | 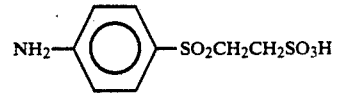 | 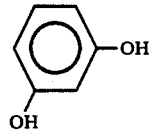 | 610 |
| 72 | 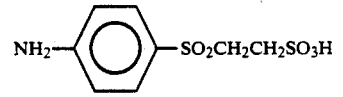 | 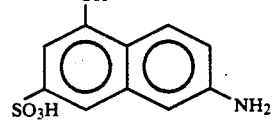 | 610 |

-continued

| No. | Compound of formula (V) | Compound of formula (VIII) | λmax (nm) |
|---|---|---|---|
| 73 | NH₂—⟨C₆H₄⟩—SO₂CH₂CH₂SO₃H | OH / SO₃H / NHCOCH₃ (naphthol) | 610 |

EXAMPLE 10

An ink was prepared from the following composition by the same procedure as in Example 8.

| | |
|---|---|
| Trisazo compound of Example 9 (No. 42) | 3.0 parts |
| Triethylene glycol | 5.5 parts |
| Polyethylene glycol #200 | 10.0 parts |
| Dehydroacetic acid sodium salt | 0.1 part |
| Deionized water | 81.4 parts |

The ink was sealed into a glass container and left standing at 20° C. for 6 months or at 50° C. for 2 weeks. After standing, the ink showed no deposition of crystalline matter, demonstrating a high stability of its quality.

EXAMPLE 11

An ink was prepared from the following composition by the same procedure as in Example 8.

| | |
|---|---|
| Trisazo compound of Example 9 (No. 62) | 3.0 parts |
| Diethylene glycol | 10.0 parts |
| Glycerine | 3 parts |
| Dehydroacetic acid sodium salt | 0.1 part |
| Deionized water | 83.9 parts |

Using the ink, an ink jet recording was continuously performed by the same procedure as in Example 8. As the result, no clogging of nozzle took place, and the result was stable.

We claim:

1. A trisazo compound represented by the following formula (I) in the free acid form:

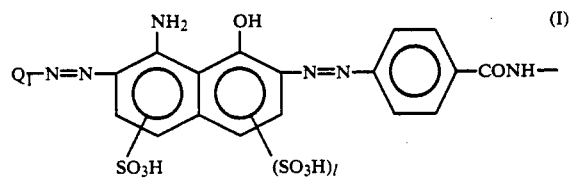

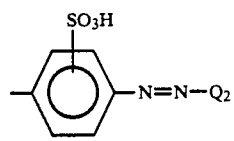

wherein Q₁ and Q₂ independently of one another are each unsubstituted or substituted phenyl or naphthyl group and l represents 0 or 1.

2. The trisazo compound according to claim 1 represented by the following formula (II) in the free acid form:

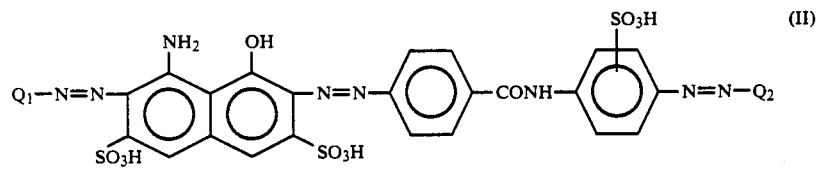

wherein Q₁ and Q₂ are as defined in claim 1.

3. The trisazo compound according to claim 1 represented by the following formula (III) in the free acid form:

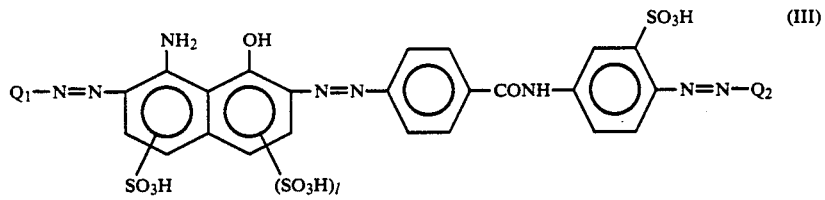

wherein l, Q₁ and Q₂ are as defined in claim 1.

4. The trisazo compound according to claim 1 represented by the following formula (IV) in the free acid form:

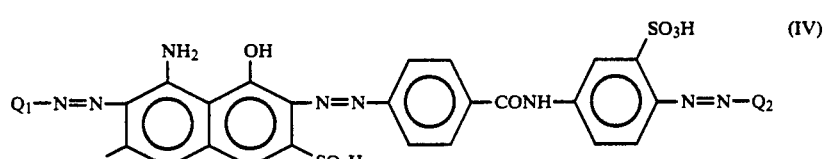

wherein $Q_1$ and $Q_2$ are as defined in claim 1.

5. The trisazo compound according to claim 1, wherein $Q_1$ is a phenyl group represented by the following formula:

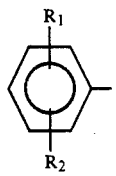

wherein $R_1$ and $R_2$ independently of one another are each hydrogen, nitro, sulfo, sulfamoyl, alkyl, alkoxy, substituted or unsubstituted amino, carboxy or halogeno group.

6. The trisazo compound according to claim 1 wherein $Q_1$ is a naphthyl group represented by the following formula:

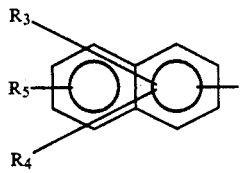

wherein $R_3$, $R_4$ and $R_5$ independently of one another are each hydrogen, hydroxy or sulfo group.

7. The trisazo compound according to claim 1, wherein $Q_2$ is a phenyl group substituted once, twice or thrice by hydroxy group and unsubstituted or substituted by a substituted or unsubstituted amino, sulfo, alkyl, alkoxy or carboxy group.

8. The trisazo compound according to claim 1, wherein $Q_2$ is a phenyl group substituted once or twice by substituted or unsubstituted amino group and unsubstituted or substituted by a hydroxy, sulfo, alkyl, alkoxy or carboxy group.

9. The trisazo compound according to claim 1, wherein $Q_2$ is a naphthyl group substituted once or twice by hydroxy group and unsubstituted or substituted by sulfo, amino, acetyl, phenyl, sulfophenyl, disulfophenyl, benzoyl or methylamino group.

10. The trisazo compound according to claim 1, wherein $Q_2$ is a naphthyl group substituted once or twice by unsubstituted amino group or methyl-, ethyl-, hydroxyethyl-, cyanoethyl-, acetyl- or carbamoyl-substituted amino groups, and unsubstituted or substituted by hydroxy or sulfo.

* * * * *